Nov. 7, 1950 J. T. MULLIN 2,529,097

SOUND RECORDING AND REPRODUCING SYSTEM WITH RECORDED CONTROL SIGNAL

Filed Jan. 6, 1947 2 Sheets-Sheet 1

INVENTOR.
John T. Mullin
BY Paul D. Flehr
ATTORNEY

Nov. 7, 1950

J. T. MULLIN

SOUND RECORDING AND REPRODUCING SYSTEM WITH RECORDED CONTROL SIGNAL 2,529,097

Filed Jan. 6, 1947

2 Sheets-Sheet 2

INVENTOR

John T. Mullin

BY Paul D. Flehr

ATTORNEY

Patented Nov. 7, 1950 2,529,097

UNITED STATES PATENT OFFICE 2,529,097

SOUND RECORDING AND REPRODUCING SYSTEM WITH RECORDED CONTROL SIGNAL

John T. Mullin, San Francisco, Calif., assignor to W. A. Palmer Films, Inc., San Francisco, Calif., a corporation of California Application January 6, 1947, Serial No. 720,398

10 Claims. (Cl. 179—100.1)

This invention relates generally to sound recording and reproducing systems, methods and records for use with the same. In general the invention is applicable to systems using conventional types of sound records, including discs provided with a sound groove, photographically recorded film records, and records of the magnetic wire or ribbon type.

In the reproduction of sound records it is frequently desirable to effect operation of a response device, such as a signal lamp, at certain predetermined times while the record is being reproduced. For example where a record is being used in conjunction with a slide projector, it is desirable to effect automatic flashing of a signal lamp to indicate to the operator that the slide should be changed. A method for this purpose which has been used in the past employs a control frequency which is recorded upon the same sound record, and which is applied for short periods of time at points of the sound record where it is desired to effect the response. The control frequency is constant and in a typical instance is 30 C. P. S. (cycles per second). Such a frequency is well below the lower limit usually employed for sound recording (generally about 100 C. P. S.). The amplitude level of the control frequency must be well below the amplitude level of the sound recording in order to avoid distortion and like interference with normal sound reproduction. When using such a record a separate network is provided for receiving the control frequency, including filter means which is selective to the 30 cycle pulses. The output of this network is applied to operate suitable response means, such as a relay and signal light.

Prior methods of the above character have given considerable difficulty in actual operation, due primarily to false operation of the response device. For example false operation is frequently caused by an accidental blow upon the housing of the apparatus, which causes false pulses in the network with false operation of the response means. Also false operation is frequently caused during fingering of the electrical pick-up, by accidentally scraping the needle of the pick-up across the grooves of the record, or by motor rumble. False operation appears to be augmented by the fact that the intensity level of the recorded 30 cycle frequency must be kept relatively low compared to the intensity of the sound record, in order to minimize distortion as previously mentioned. Any attempts to raise the general intensity level of the control frequency serves to increase distortion to a noticeable level.

It is an object of the present invention to provide a sound recording and reproducing method and system which will avoid the difficulties outlined above which have been experienced with prior methods and systems.

A further object of the invention is to provide a method and system of the above character which will be relatively free of false operation with respect to the desired operation of a signal lamp or like response device, and which will not interfere with the quality of the reproduced sound.

A further object of the invention is to provide a novel network for use with the present system, and which is characterized by application of two recorded control frequencies from the record, and which utilizes one frequency to eliminate the possibility of false operation, and the other frequency for operating the signal or other response device.

A further object of the invention is to provide a network of the type last described and which makes use of limiting means to enable the higher of the two control frequencies to render the network immune to false pulses.

Another object of the invention is to provide a novel record or recording for use in conjunction with the present method and system.

Further objects of the invention will appear from the following description in which the preferred embodiments have been set forth in detail in conjunction with the accompanying drawing.

Referring to the drawing.

The present method and system involves the use of two control frequencies which are recorded upon a sound record, and which are both well below the lower minimum of the recorded voice frequency range. While the exact frequency selected may vary in different instances, good results have been secured by using one control frequency of 50 C. P. S., and a second of 30 C. P. S. Each of these frequencies is recorded at substantially the same volume level, and the general level of each frequency should be well below the general level of the sound record, as for example from 16 to 20 decibels below the maximum level of the recorded sound. In order to utilize such a record I employ a special network in conjunction with the reproduction system, and this network is so constructed that when it is receiving the 50 cycle frequency, it is inoperative to produce a false response. However during the short interval that the network does not receive the 50 cycle frequency, the 30 cycle frequency is received and effects the desired response.

Figure 1:
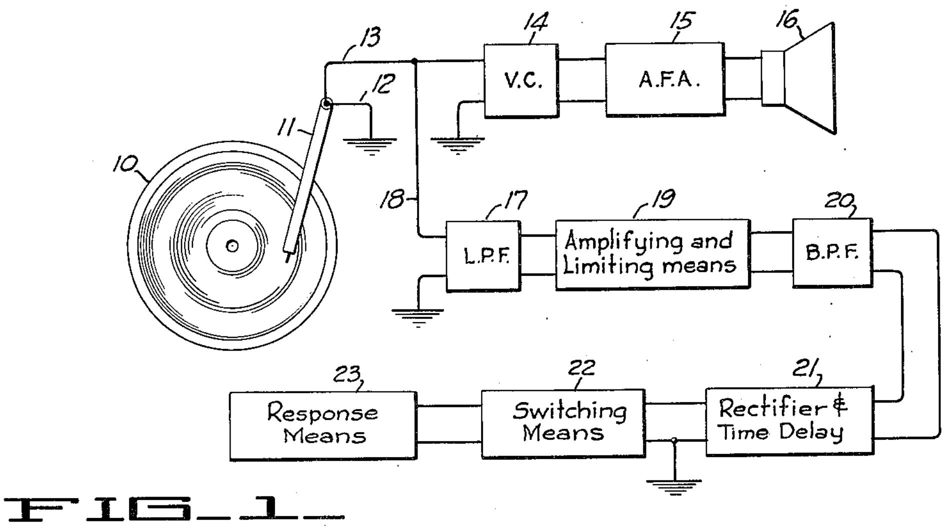
Figure 1 is a simplified circuit diagram illustrating a system incorporating the present invention.

Referring now to Figure 1 of the drawing, there is diagrammatically illustrated a sound record 10 of the disc type which is provided with the customary sound record groove. It is presumed that this record is carried upon a turntable, in conjunction with the usual electrical pick-up arm 11. With my system any one of a number of types of pick-up units can be used, including crystal and magnetic. One lead 12 from the pick-up unit is generally grounded and the other lead 13 extends to a suitable volume control 14. An audio frequency amplifying network 15 connects with the volume control 14, and has its output connected to the loudspeaker 16. This part of the system can be conventional and serves to reproduce the recorded sound frequencies ranging for example from a lower limit of say 100 cycles and an upper limit of 10,000 cycles or more.

In addition to the conventional network described above, my system makes use of a second network which includes the low pass filter 17. Assuming recorded control frequencies of 50 and 30 cycles, this filter is constructed to pass such frequencies, but to reject or attenuate frequencies within the normal sound range upward from say 100 C. P. S. Conductor 18 connects the input of this filter to the conductor 13 leading from the pick-up. Filter 17 connects to the input of the amplifying and limiting means 19. This amplifying means is adapted to secure a substantial amplification gain and in addition serves to clip or limit the amplitude of the amplified pulses. The output of the amplifying and limiting means 19 connects to the band pass filter 20, which is adapted to pass the frequency of 30 C. P. S., but which rejects frequencies of the order of 50 C. P. S. or more. A rectifier and time delay 21 receives pulses passed by the band pass filter 20 and serves to apply rectified pulses to the switching means 22. The switching means as will be presently described can consist of a vacuum tube of the electronic type or a gas tube relay, in conjunction with a magnetic relay. The magnetic relay is connected to operate the response means 23, which in a typical instance may be a signal lamp.

Operation of the system shown in Figure 1 can be described as follows: Upon playing the record the conventional network (14, 15 and 16) reproduces the normal recorded sound. At the same time a 50 cycle tone, interrupted by short intervals by a 30 cycle tone, passes through filter 17 and is applied to the amplifying and limiting means 19. During the periods when the 50 cycles are being received by the amplifying means, the relatively small amount of energy passed by filter 20 and rectified by the rectifier 21, is insufficient to apply operating voltages to the switching means 22. Due to the suppressing action of the limiting amplifier means 19, the network at that time is not affected by conditions or pulses which in the prior systems would cause false operation. In other words, such transient pulses as might be caused by blows upon the housing of the equipment, scraping of the record grooves, motor rumble or touching the side of the pick-up with one's finger, will not cause sufficient voltage to be applied by the rectifier 21 to the switch-means to effect operation.

During intervals when the 50 cycle control frequency is interrupted, the 30 cycle frequency is likewise passed by filter 17 to the amplifier, and then passed by filter 20 to produce a sufficient rectified voltage in the rectifier 21 to operate the switching means 22. Pulses from the output of amplifier 19, although subject to clipping due to the limiting action of this apparatus, are capable of passing the filter 20 relatively efficiently compared to the 50 cycle pulses, whereby the rectified components of such pulses are ample to operate the switching means.

Figure 2:
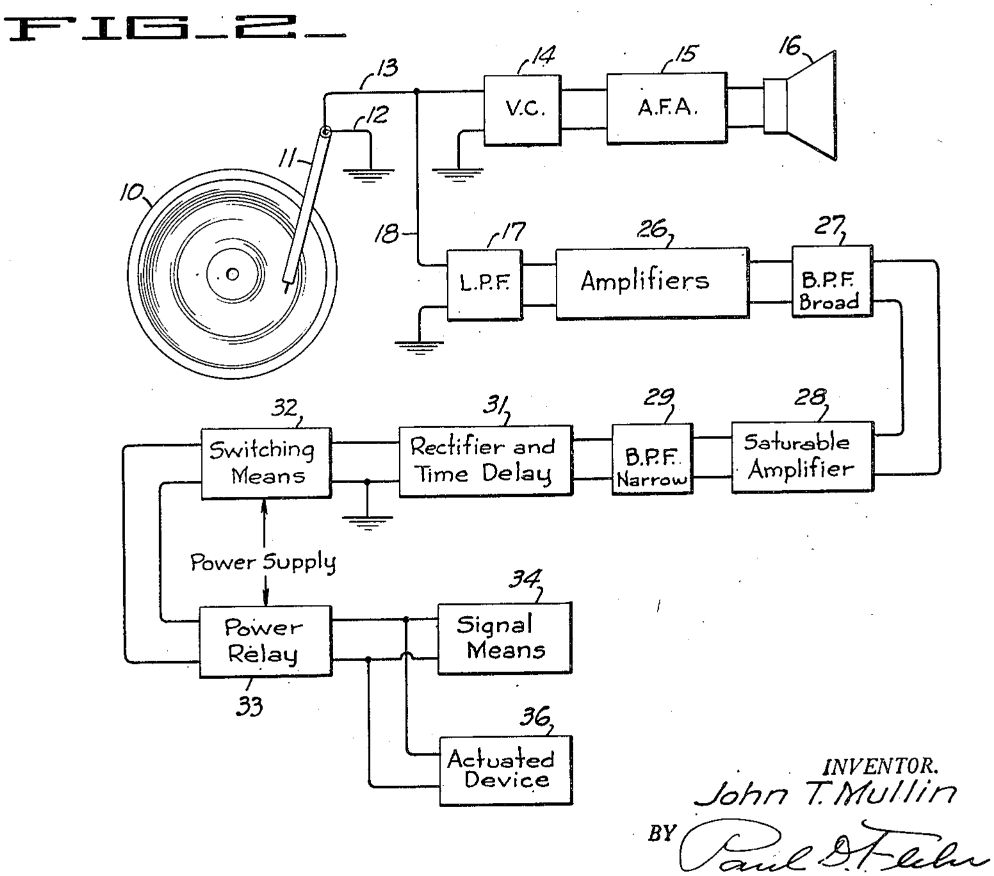
Figure 2 is a circuit diagram illustrating the system in greater detail.

Figure 2 illustrates a more elaborate type of network for the 50 and 30 cycle control frequencies. In this instance the amplifying and limiting means includes the high gain amplifier 26, having its output connected to a band pass filter 27 which is sufficiently broad to pass both 50 and 30 cycles, but which attenuates above 50 cycles and below 30 cycles. Pulses passed by this filter are applied to a saturable amplifier 28, which in turn has its output connected to the relatively narrow band pass filter 29 arranged to efficiently pass 30 C. P. S. but which cuts off higher frequencies including 50 C. P. S. This filter connects with the rectifier and time delay 31, which applies rectified pulses to the electronic switching means 32. The switching means operates a power relay 33 which can be of the magnetic type, and which can be used to control one or more response circuits, including for example a circuit for operation of the signalling means 34, and a circuit for operating a device 36.

The more elaborate network of Figure 2 operates in the same manner as Figure 1. When pulses of 50 C. P. S. are being received such pulses are passed by filter 17 and amplified at 26. The amplified pulses are then applied to the band pass filter 27 which serves to attenuate frequencies above 50 C. P. S. and below 30 C. P. S. The pulses are then applied to the limiter or saturable amplifier 28, which serves to limit or clip the pulses as to amplitude. In a typical instance the clipping may be on a ratio of the order of 40 to 1. The pulses are then applied to the narrow band pass filter 29, which serves to efficiently pass pulses of 30 C. P. S., but which cuts off higher frequencies including 50 C. P. S. During periods when 50 C. P. S. is being received, the pulses received by the rectifier and time delay 31 are such that an insufficient voltage is provided for operation of the switching means 32. Furthermore, at this time, transient pulses, such as previously described in connection with Figure 1, cannot cause false operation, because such pulses are greatly compressed by the action of the limiting amplifier while the latter is saturated by the 50 cycle pulses. During periods of interruption of 50 C. P. S. pulses, pulses of 30 C. P. S. are received, and such pulses are then transmitted by the network with sufficient efficiency to provide rectified voltages for effectively operating the switching means 32.

In both Figures 1 and 2 the time delay in connection with the filter 31 makes possible a short delay between the instant when the 30 C. P. S. pulses are first received, and operation of the signalling means or other response device. For example in actual practice where the duration of the 30 C. P. S. is of the order of 1 to 1.5 seconds, the time delay can be of the order of 0.5 second. Such a time delay likewise aids in preventing false operation, since a few transient pulses simulating 30 C. P. S. cannot effect operation of the switching means 32, since the duration is less than the time delay.

Figure 3:
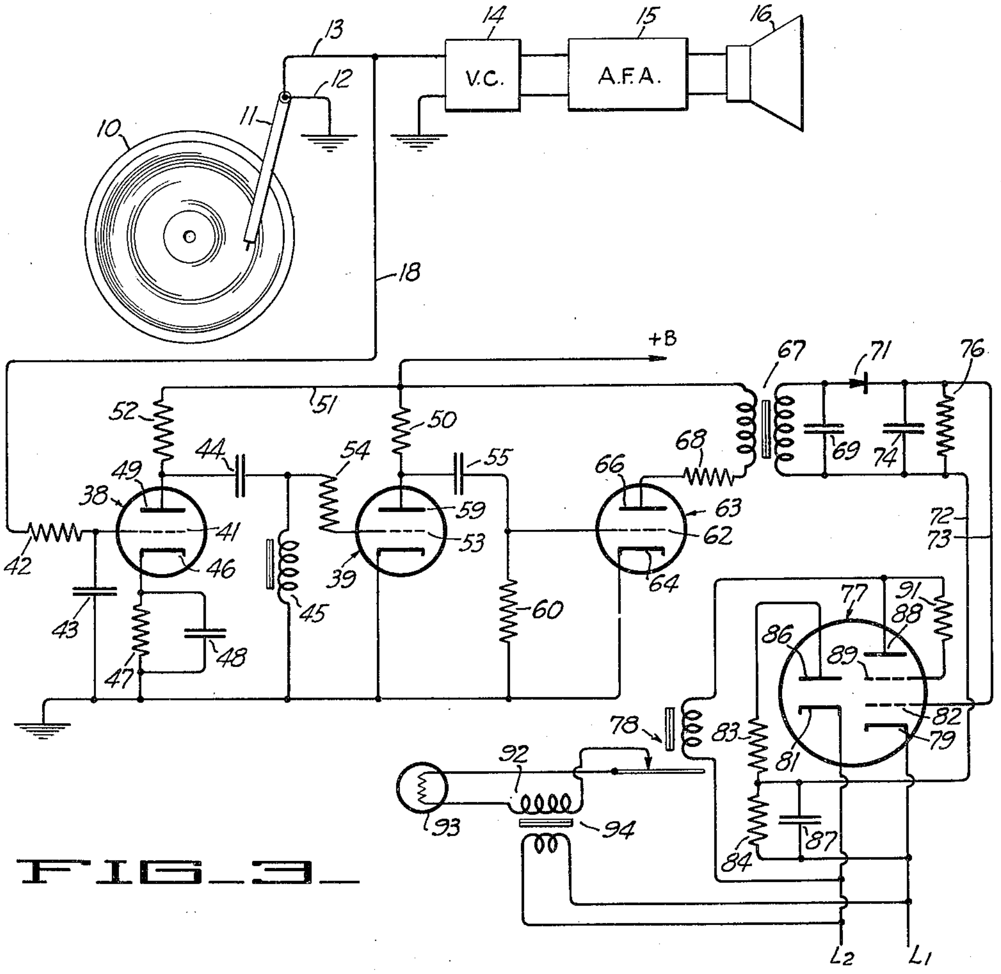
Figure 3 is a circuit diagram illustrating a particular type of electrical network which can be used in conjunction with the control frequencies.

Figure 3 illustrates suitable electronic equipment for forming the network of Figure 2. Thus vacuum tube 38 forms the amplifier 26, with tubes 38 and 39 operating as saturable limiting amplifiers. The control grid 41 of tube 38 is coupled to the pick-up by resistance 42 and condenser 43. These elements likewise form a resistance-capacitance filter which will readily pass both 50 and 30 C. P. S., but tends to reject or attenuate higher frequencies, including frequencies of the order of 100 C. P. S. or more. Cathode 46 of tube 38 is connected to ground in series with biasing resistor 47, which is shunted by condenser 48. Plate 49 is connected to the B battery supply conductor 51, in series with resistor 52.

Amplifying tube 39 operates as a limiter and has its grid 53 coupled to the plate of tube 38 through resistor 54 and condenser 44. Inductance 45 and condenser 44 act as a band pass filter, broadly tuned to pass both 50 and 30 cycles, but to attenuate above and below such frequencies. The resonant peak of this coil and condenser can be in the neighborhood of 38 cycles. Since saturation at the plate 59 of tube 39 is generally insufficient, the grid 62 of tube 63 is coupled through condenser 55 to the plate 59 of tube 39. Resistor 60 permits the grid 62 of tube 63 to be biased during operation. The cathode 64 of this tube is grounded and plate 66 is connected to one side of the primary of transformer 67. The other side of this transformer primary connects to the B battery supply conductor 51. This transformer is sharply tuned by condenser 69 to operate as a narrow band pass filter to pass the 30 C. P. S. and to reject higher frequencies including 50 C. P. S. and lower frequencies.

One side of the secondary of transformer 67 connects in series with the rectifier 71, whereby pulses from the transformer's secondary are rectified. The output from the recetifier, formed by conductors 72 and 73, is shunted by condenser 74 and resistor 76. Condenser 74 is of such capacitance value that an appreciable time interval is required to charge the same, and this provides the desired time delay. Resistor 76 provides a discharge path for the condenser, whereby the voltage across the condenser decays to substantially zero upon discontinuance of a series of rectified pulses.

Tube 77 forms an electronic switching means for operation of the magnetic relay 78. While various types of tubes can be used the particular tube illustrated is of the type known by manufacturer's specifications as No. 117L7 and incorporates a screen and a control grid, and also a separate rectifier. As will be presently explained the rectifier is utilized in order to enable alternating current operation, with maintenance of a proper D. C. biasing voltage upon the control grid. Lines L—1 and L—2 represent a commercial source of current supply, such as the conventional 60 cycle 115 volt A. C. supply lines. Line L—1 is shown connected to the cathode 79, and line L—2 to the cathode 81 of the rectifier. Control grid 82 connects with the conductor 73. Conductor 72 connects at a point between resistors 83 and 84. The other terminal of resistor 83 connects with the anode 86 of the diode rectifier. The other side of resistor 84 connects with line L—1, and this resistor is shunted by condenser 87. Plate 88 is connected to one side of the winding of relay 78, and the other side of this winding connects with line L—2. Screen 89 also connects to the plate 88 in series with the resistor 91.

A response circuit 92 is connected for operation by the magnetic relay 78. As an example of such a circuit there is shown a signal lamp 93 connected in series with the relay contacts and a source of current, which in this instance is a stepped-down transformer 94. Thus when the relay is energized to close its contacts the signal lamp is flashed.

Operation of the apparatus shown in Figure 3 is substantially the same as described with reference to Figure 2. Resistor 42 together with condenser 43 forms the filter 17 of Figure 2, and the tube 38 forms an amplifier. Coil 45 and condenser 44 form the band pass filter 27, which is broadly tuned to 38 C. P. S. Tubes 39 and 63 form the saturable amplifier 28, and transformer 67 together with condenser 69 form the narrow or sharply tuned band pass filter 29, which is resonant to 30 C. P. S. Rectifier 71 together with condenser 74 and resistor 76 form the rectifier and time delay 31. Tube 77 forms the switching means 32, and magnetic relay 78 forms the power relay 33. In a typical instance the time delay afforded by condenser 74 together with resistor 76 prevents operation of the magnetic relay 78 for an interval of the order of 0.5 second, where the 30 cycles is of a duration of 1 to 1.5 seconds. The diode rectifier incorporated in tube 77 provides the desired D. C. bias for the control grid 82, which for the tubes previously specified can be of the order of from minus 20 to 25 volts. When a 30 cycle frequency is received by the network just described, in a typical instance the voltage upon the control grid 82 of the switching tube 77 will be increased to a value of the order of zero volts D. C. from a normal biasing voltage of the order of from 20 to 25 volts. The latter bias affords high plate to cathode impedance whereby the winding of relay 78 is not energized. However, application of the more positive voltage to grid 82 greatly reduces the plate to cathode impedance, and as a result sufficient current flows through the winding of the relay to close its contacts.

Figure 4:
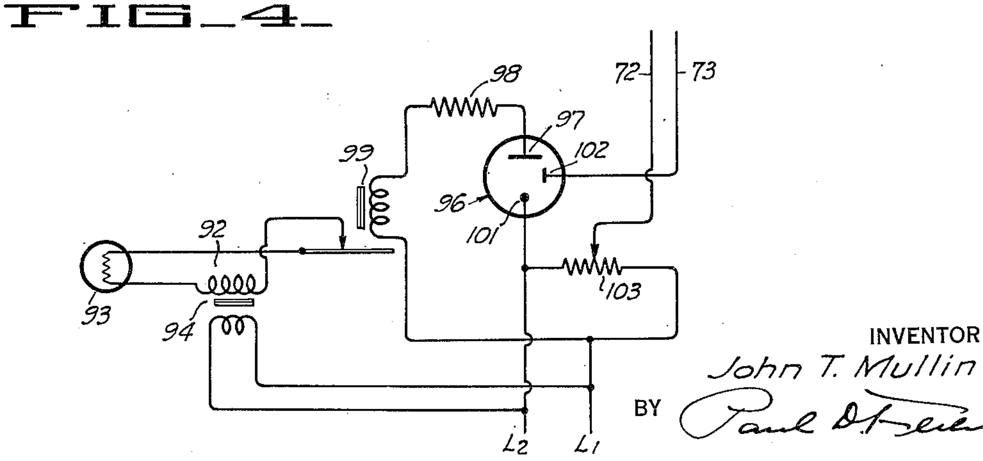
Figure 4 is a circuit diagram showing a modification of the arrangement shown in Figure 3.

In place of a vacuum type of switching tube it is possible to utilize a gaseous relay tube 96 as shown in Figure 4. The anode 97 of this tube connects in series with resistor 98 to one side of the winding of relay 99. The other side of this relay connects to the current supply line L—1. The current supply line L—2 connects with the cathode 101. The control element 102 connects with the conductor 73 leading from the rectifier and time delay. The other conductor 72 from the time delay connects with a potentiometer or resistor 103, one terminal of which is connected to the cathode 101, and the other terminal with line L—1. Potentiometer 103 provides a sensitivity adjustment. Upon application of a potential to element 102 above a given value the plate to cathode impedance of tube 96 falls to a relatively low value, whereby current is supplied to the winding of relay 99 to operate the same.

It will be evident from the foregoing that my invention has wide application to sound record reproducing systems where it is desired to effect control of a device at predetermined time intervals during the playing of a record. As previously pointed out the device to be operated may in many instances be a signal lamp. In other instances it may be a device requiring positive operation by energization of a motor or solenoid, which is supplied with current upon closing of the relay contacts. For example when the records are being used with a light projector as previously mentioned, one may utilize a solenoid operated upon closing of the relay for automatically changing the projector slides.

In general my invention affords a high degree of reliability without in any way interfering with the high quality of the desired sound record reproduction, and with complete freedom from false operation.

I claim:

1. In a sound recording and reproducing method of the character described, the steps of recording on a sound record voice frequencies ranging above a given minimum value, simultaneously recording upon the same sound record a separate control frequency below said minimum frequency value, periodically interrupting said control frequency for short periods and recording a second control frequency of substantially lower value during said short periods of interruption whereby said second control frequency may be employed to produce a predetermined response in synchronous relation to said voice frequencies.

2. In a sound recording and reproducing method of the character described, the steps of recording on a sound record voice frequencies ranging above a given minimum value, simultaneously recording upon the same sound record a separate sound control frequency below said minimum frequency value, periodically interrupting said control frequency for short periods, recording a second control frequency of substantially lower value on said record during said short periods of interruption, reproducing the voice record, concurrently translating the second control frequency into current pulses, causing the pulses to effect a response, translating the first control frequency into current pulses concurrently with reproduction of the sound record, and causing said last named pulses to prevent a false response due to transient pulses.

3. In a control method of the character described for amplifying and repeating voice frequencies and electrical control pulses, and in which a response is produced by control pulses; the method comprising producing a constant control pulse frequency which is lower in frequency than the voice frequencies, recurrently interrupting said frequency and producing a second lower control pulse frequency during the intervals of interruption, causing said first control pulse frequency to substantially block passage of the second control pulse frequency, and amplifying pulses of the second control frequency during the periods of interruption and causing said pulses to produce a predetermined response.

4. In a sound reproducing system of the type having a sound record with recorded voice frequencies thereon and also with two constant recorded control frequencies, both said control frequencies being of a value below the minimum frequency of the voice frequencies, one control frequency being continuous except for short periods of interruption when it is desired to effect operation of a response means and the second control frequency being recorded for said periods of interruption and being of a frequency lower than the first control frequency; electrical control apparatus comprising means for translating said control frequencies into electrical pulses, a response means, means whereby said response means is adapted to be operated by pulses derived from the lower one of said frequencies, and an amplifying network interposed between the response means and the translating means and including a pulse amplitude limiter for limiting the amplitude of pulses of the higher control frequency and compression pulses of the lower frequency while pulses of the higher control frequency are being received, thereby preventing operation of the response means except during said periods of interruption.

5. In a sound reproducing system of the type having a sound record with recorded voice frequencies thereon and also with two constant recorded control frequencies, each of said control frequencies being of a value below the minimum recorded frequency of the voice frequencies, one control frequency being continuous except for short periods of interruption when it is desired to effect operation of response means and the second control frequency being recorded for said periods of interruption and being of a frequency lower than the first control frequency; electrical control apparatus comprising means for translating said control frequencies into electrical pulses, a response means, means whereby the response means is adapted to be operated by the lower one of said frequencies, and an amplifying network interposed between the response means and the translating means and serving to effect operation of the response means during said periods of interruption, said network including a pulse amplitude limiter serving to limit the amplitude of pulses of said higher frequency and to compress transient pulses of the lower frequency while pulses of the higher frequency are being received, and filter means serving to pass pulses at the lower one of said frequencies and to reject higher frequencies, including pulses of a frequency corresponding to the higher one of the control frequencies.

6. In an electrical system of the character described, an electrical network comprising means adapted to receive pulses of voice frequencies together with pulses of two constant control frequencies, the first control frequency being substantially lower than the voice frequency and the second control frequency being lower than the first, means for amplifying both the control frequencies and for limiting the amplitude of the same, thereby compressing transient pulses of the second frequency when pulses of the first control frequency are being received, filter means adapted to pass pulses of the second control frequency and to reject pulses of the higher control frequency, means for rectifying the pulses of said lower frequency, a response circuit, relay means for controlling the response circuit, switching means for operating said relay means and means whereby said switching means is controlled by said rectified pulses.

7. In electrical apparatus adapted to receive electrical pulses at two constant but different control frequencies, the higher control frequency being continuous except for short periods of interruption, and the lower control frequency being received during said periods of interruption, means for amplifying pulses of both said frequencies, amplitude limting means serving to clip amplified pulses at the higher control frequency and to compress transient pulses of the lower control frequency while pulses at the higher frequency are being received, filter means adapted to pass pulses from said limiting means at the lower control frequency and to reject pulses at the higher control frequency, rectifying means serving to rectify the pulses passed by the filter means, electrical switching means, means whereby said switching means is adapted to be controlled by voltages provided by the rectified pulses, time delay means for delaying the application of controlling voltages to said switching means from said rectifying means, response means, and an electrical relay for controlling the response means, said relay being connected for operation by said switching means.

8. In electrical apparatus adapted to receive electrical pulses of two constant control frequencies, the second control frequency being lower than the first, the first or higher frequency being received continuously except for short periods of interruption and the second frequency being received during said periods of interruption, means for amplifying the received pulses, filter means connected to the output of said amplifying means and serving to pass pulses of both said control frequencies, limiting means having its input connected to the filter means and adapted to limit or clip amplified pulses with respect to the amplitude of the same, thereby compressing transient pulses of the lower control frequency while pulses of the higher control frequency are being received, filter means connected to the output of said limiting means and serving to pass pulses of the lower control frequency and to reject pulses of the higher control frequency, rectifying means serving to receive pulses from said filter means, response means, relay means for controlling the response means, switching means for controlling the relay means, said rectifying means having a circuit for sending pulses to said switch means, and electrical time delay means including a condenser and a leak resistor shunted about the same, said time delay means being connected to receive rectified pulses and to delay application of controlling voltages to the switching means.

9. In sound reproducing systems of the type having a sound record with recorded voice frequencies thereon and also with two constant recorded control frequencies, each of said control frequencies being of a value below the minimum recorded frequency of the voice frequencies, one control frequency being continuous except for short periods of interruption when it is desired to effect operation of a response means, and the second control frequency being recorded for said periods of interruption and being of a frequency lower than the first control frequency; electrical control apparatus comprising means for translating said control frequencies into electrical pulses, a response means, a filter adapted to pass the lower one of said control frequencies and to reject the higher control frequency, said filter serving to apply pulses to the response means, and an electrical network disposed between the translating means and said filter, said network including filter means serving to reject recorded voice frequencies and to pass both said control frequencies, and a limiting amplifier serving to repeat pulses passing said last named filter means and to apply clipped pulses corresponding to the same to said first named filter means, thereby causing the network to be relatively ineffective to amplify and repeat transient pulses of the second control frequency while the first control frequency is being applied.

10. In sound reproducing systems of the type having a sound record with recorded voice frequencies thereon and also with two constant recorded control frequencies, each of said control frequencies being of a value below the minimum recorded frequency of the voice frequencies, one control frequency being continuous except for such short periods of interruption when it is desired to effect operation of a response means and the second control frequency being recorded for said periods of interruption and being of a frequency lower than the first control frequency; electrical apparatus comprising means for translating said control frequencies into electrical pulses, a response means, a filter means tuned to the lower one of said control frequencies and serving to reject the higher one of the control frequencies, said filter means being connected to apply operating pulses to the response means, time delay means interposed between said filter means and said response means, and an electrical network interposed between the translating means and said filter means, said network including another filter means serving to reject recorded voice frequencies and to pass both said control frequencies, and a limiting amplifier receiving pulses passing said last named filter means and applying clipped pulses corresponding to the same to said first named filter means, said amplifier serving to compress transient pulses of the lower frequency while pulses of the higher frequency are being received.

JOHN T. MULLIN.

REFERENCES CITED

The following references are of record in the file of this patent:

UNITED STATES PATENTS

| Number | Name | Date |
|---|---|---|
| 1,834,886 | Barton | Dec. 1, 1931 |
| 1,909,765 | Jenkins | May 16, 1933 |
| 1,987,544 | Wood | Jan. 8, 1935 |
| 2,076,937 | Cannon | Apr. 13, 1937 |
| 2,096,019 | Adair | Oct. 19, 1937 |
| 2,116,314 | Jenkins | May 3, 1938 |
| 2,304,856 | Snow | Dec. 15, 1942 |
| 2,308,456 | Reiskind | Jan. 12, 1943 |
| 2,337,958 | Albin | Dec. 28, 1943 |
| 2,364,723 | Kellogg | Dec. 12, 1944 |